(12) United States Patent
Kong

(10) Patent No.: US 12,319,219 B2
(45) Date of Patent: Jun. 3, 2025

(54) APPARATUS FOR KNEE AIRBAG

(71) Applicants: Hyundai Motor Company, Seoul (KR); Kia Corporation, Seoul (KR)

(72) Inventor: Byung Seok Kong, Gunpo-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/421,905

(22) Filed: Jan. 24, 2024

(65) Prior Publication Data
US 2024/0157904 A1 May 16, 2024

Related U.S. Application Data

(63) Continuation of application No. 17/962,106, filed on Oct. 7, 2022, now abandoned.

(30) Foreign Application Priority Data
Nov. 2, 2021 (KR) .......................... 10-2021-0148388

(51) Int. Cl.
*B60R 21/206* (2011.01)
*B60R 21/231* (2011.01)
*B60R 21/16* (2006.01)
*B60R 21/216* (2011.01)

(52) U.S. Cl.
CPC .......... *B60R 21/206* (2013.01); *B60R 21/231* (2013.01); *B60R 2021/161* (2013.01); *B60R 2021/2161* (2013.01); *B60R 2021/23169* (2013.01)

(58) Field of Classification Search
CPC ... B60R 21/206; B60R 21/231; B60R 21/216; B60R 21/205; B60R 2021/23169; B60R 2021/161; B60R 2021/2161
See application file for complete search history.

(56) References Cited

U.S. PATENT DOCUMENTS

| 6,431,583 | B1 | 8/2002 | Schneider |
| 6,435,554 | B1 | 8/2002 | Feldman |
| 2005/0062264 | A1 | 3/2005 | Arwood et al. |
| 2017/0232920 | A1 | 8/2017 | Abe et al. |
| 2018/0056923 | A1 | 3/2018 | Kang |

FOREIGN PATENT DOCUMENTS

| JP | H05229392 A | 9/1993 |
| JP | H11105660 A | 4/1999 |
| JP | 5053520 B2 | 10/2012 |
| JP | 2016043735 A | 4/2016 |
| KR | 20100136236 A | 12/2010 |
| KR | 101360341 B1 | 2/2014 |
| KR | 20180024848 A | 3/2018 |
| WO | 03095272 A1 | 11/2003 |

OTHER PUBLICATIONS

Merriam-Webster, Definition of "cockpit"; https://www.merriam-webster.com/dictionary/cockpit; Jun. 14, 2023; 12 pages.

*Primary Examiner* — Keith J Frisby
(74) *Attorney, Agent, or Firm* — Slater Matsil, LLP

(57) ABSTRACT

An embodiment apparatus for a knee airbag includes an airbag located inside a cockpit, the cockpit configured to be located in a front side of an interior of a vehicle, an airbag door disposed in the cockpit at a position facing an occupant knee area, the airbag door being configured to open when the airbag is deployed, an absorber located at a front end of the airbag, and a guide part surrounding at least two surfaces of the absorber and the airbag.

7 Claims, 9 Drawing Sheets

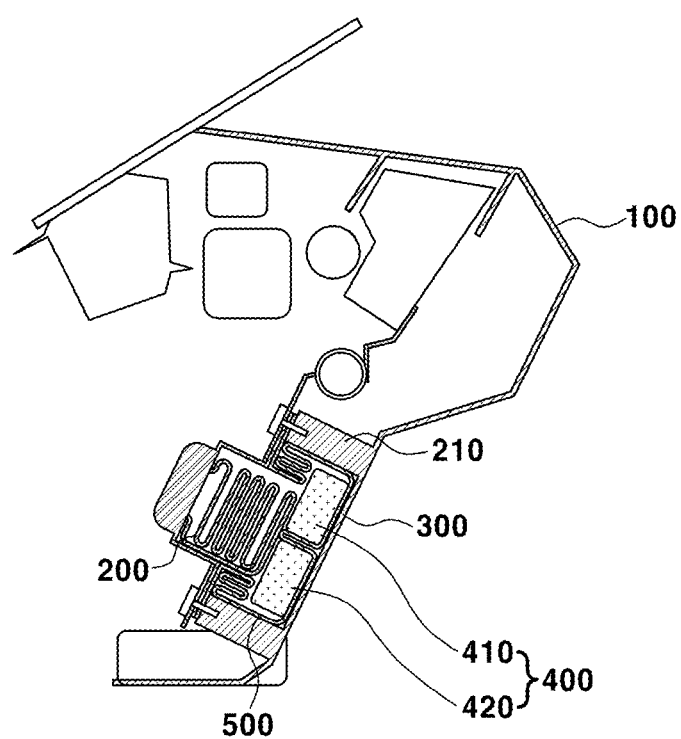

UPWARD DEVELOPMENT

APPARATUS FOR KNEE AIRBAG

CROSS-REFERENCE TO RELATED APPLICATIONS

This application is a continuation of U.S. application Ser. No. 17/962,106, filed on Oct. 7, 2022, which claims the benefit of Korean Patent Application No. 10-2021-0148388, filed on Nov. 2, 2021, which application is hereby incorporated herein by reference.

TECHNICAL FIELD

The present disclosure relates to an apparatus for a knee airbag.

BACKGROUND

An airbag for a vehicle is a safety device which deploys a cushion of an airbag when a collision occurs to alleviate an impact on an occupant and includes a driver airbag (DAB), a passenger airbag (PAB), a side airbag (SAB), a curtain airbag (CAB), and a knee airbag (KAB).

Generally, the KAB includes a retainer, an inflator installed in the retainer and configured to provide a gas, a cushion configured to be deployed by receiving an injection of a gas of the inflator, and a cover configured to accommodate the cushion into the retainer, and the KAB is installed in a lower portion of a glove box. During a collision of a vehicle, the cushion of the KAB is deployed toward a knee side of the occupant and protects the knee of the driver or occupant.

A conventional apparatus for a KAB has a problem in that, in a state in which a knee and a shin of a seated person are maintained a predetermined distance or more from the apparatus for the KAB, the cushion is deployed normally, but in a state in which the knee or shin of the seated person is closer than the predetermined distance to the apparatus for the KAB, the cushion is pressed or pushed against the knee or shin of the seated person so that the cushion is not stably deployed. Therefore, there is a need to solve such a problem.

In addition, when a slim cockpit is applied according to a recent change in a driving method of the vehicle, since a distance between the knee of the seated person and an airbag device is increased, a structure for absorbing an impact applied to the knee of the occupant by being deployed in a wide space is essentially required.

SUMMARY

The present disclosure relates to an apparatus for a knee airbag. Particular embodiments relate to an apparatus for a knee airbag that is located in a slim cockpit, formed such that an airbag and an absorber are capable of being simultaneously deployed, and deployed to a position corresponding to the knee of a first row occupant.

Embodiments of the present disclosure can solve problems associated with the prior art.

One embodiment of the present disclosure provides an apparatus for a knee airbag (KAB) for absorbing an impact through an airbag which includes an absorber and is deployed to a knee of an occupant.

Another embodiment of the present disclosure provides an apparatus for a KAB that is capable of easily changing a deployment direction of an airbag through an absorber and a guide part for surrounding two or more surfaces of the airbag.

Embodiments of the present disclosure are not limited to the above-described embodiments, and other embodiments of the present disclosure, which are not mentioned, can be understood by the following description and also will be apparently understood through the described embodiments of the present disclosure. Further, the embodiments of the present disclosure can be implemented by means described in the appended claims and a combination thereof.

An apparatus for a KAB includes the following configurations.

In an exemplary embodiment, the apparatus for a KAB, which includes a cockpit located in a front side of an interior of a vehicle, an airbag located inside the cockpit so as to be deployed according to an impact, an airbag door formed in the cockpit and formed at a position facing a knee of an occupant, and opened when the airbag is deployed, an absorber located at a front end of the airbag being deployed, and a guide part configured to surround at least two surfaces of the absorber and the airbag.

In addition, the guide part may be configured to surround a front surface of the absorber and upper and lower surfaces of the absorber and the airbag.

In addition, the guide part may be configured to surround the front surface of the absorber and left and right surfaces of the absorber and the airbag.

In addition, the absorber may be formed such that two or more foams are located to be adjacent to each other.

In addition, in the absorber, two foams may be located to be spaced apart from each other based on a front surface of the guide part when the airbag is deployed.

In addition, the airbag may be inserted between the two foams spaced apart from each other.

In addition, the airbag may be mounted in a folded state in the same direction as an outer surface of the cockpit, and the guide part may be located on the side of the airbag in a folded state in a direction perpendicular to the outer surface of the cockpit.

In addition, when the cockpit has an angle that is greater than a first reference value based on a horizontal direction, a number of folds of a first folding part of the guide part located in the folded state may be greater than a number of folds of a second folding part of the guide part.

In addition, when an angle in the horizontal direction of the cockpit is smaller than the first reference value, the number of folds of the second folding part of the guide part located in the folded state may be greater than the number of folds of the first folding part of the guide part.

In addition, the absorber may be formed integrally with the airbag door.

Other aspects and preferred embodiments of the present disclosure are discussed infra.

It is understood that the term "vehicle" or "vehicular" or other similar term as used herein is inclusive of motor vehicles in general such as passenger automobiles including sport utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of embodiments of the present disclosure are discussed infra.

BRIEF DESCRIPTION OF THE DRAWINGS

The above and other features of embodiments of the present disclosure will now be described in detail with reference to certain exemplary embodiments thereof illustrated in the accompanying drawings which are given hereinbelow by way of illustration only, and thus are not limitative of the present disclosure, and wherein:

FIG. 2A is a diagram illustrating a side view of a KAB including two foams in a state of being mounted according to one embodiment of the present disclosure;

Figure 1A:
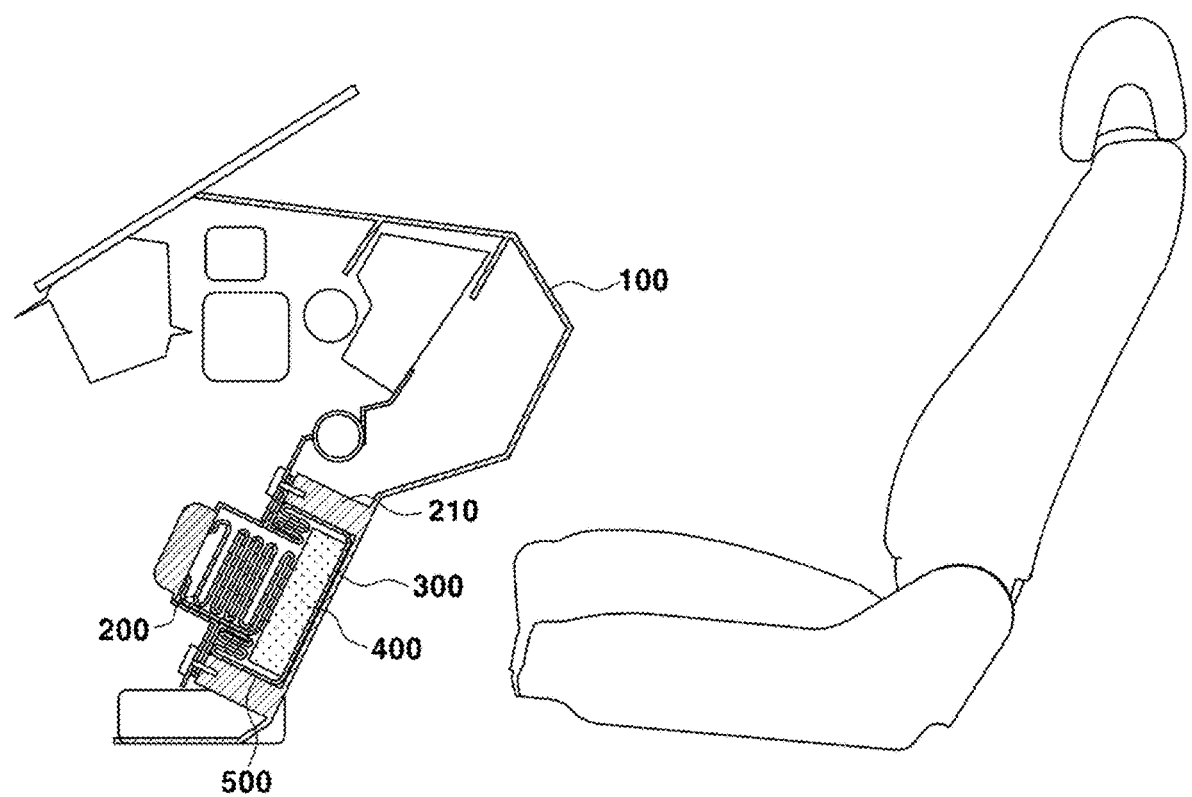
FIG. 1A is a diagram illustrating a side view of a knee airbag (KAB) including a single foam in a state of being mounted according to one embodiment of the present disclosure.

It should be understood that the appended drawings are not necessarily to scale, presenting a somewhat simplified representation of various preferred features illustrative of the basic principles of embodiments of the present disclosure. The specific design features of embodiments of the present disclosure as disclosed herein, including, for example, specific dimensions, orientations, locations, and shapes will be determined in part by the particular intended application and use environment.

In the figures, reference numbers refer to the same or equivalent parts of embodiments of the present disclosure throughout the several figures of the drawings.

DETAILED DESCRIPTION OF ILLUSTRATIVE EMBODIMENTS

Hereinafter, embodiments of the present disclosure will be described in more detail with reference to the accompanying drawings. The embodiments of the present disclosure can be modified in various forms, and the scope of the present disclosure should not be construed as being limited to the following embodiments. These embodiments are provided to more fully describe the present disclosure to those skilled in the art.

Further, the term "— part," "— housing," "— airbag" or the like used herein means a unit for processing at least one function or operation, and this unit may be implemented by hardware, software, or a combination of hardware and software.

Further, in the present specification, the terms a first, a second, and the like are assigned to components so as to distinguish these components because names of the components are the same, but these terms are not necessarily limited to the order in the following description.

In addition, in the present specification, since a "folded amount" refers to the number of folded times, a meaning in which a number of folds is relatively large refers to a length in which a region of a corresponding configuration may be deployed is longer, and a meaning in which the number of folds is relatively small refers to the length in which the region of the corresponding configuration may be deployed is shorter.

Hereinafter, embodiments will be described in detail with reference to the accompanying drawings and, in describing with reference to the accompanying drawings, the same or corresponding components are assigned the same reference numerals, and duplicate descriptions thereof will be omitted therein.

Embodiments of the present disclosure relate to a knee airbag (KAB) 200 configured to absorb an impact applied to a knee of an occupant in a first row of a vehicle including a slim cockpit 100. In addition, the slim cockpit 100 of embodiments of the present disclosure may be defined as a front interior structure of the vehicle or a glove box. In addition, since the development of eco-friendly vehicles reduces an engine room and improves a degree of freedom of a cockpit layout for autonomous driving, a maximum protrusion position of the cockpit in a lengthwise direction of the eco-friendly vehicle from the engine room is moved forward based on the vehicle, and a knee-side space from a maximum protrusion is more spaced when compared with the related art. In addition, since it is possible to achieve slimness based on the conventional engine room and cockpit layout, a configuration for protecting a knee of an occupant during a front collision is provided.

Figure 1B:
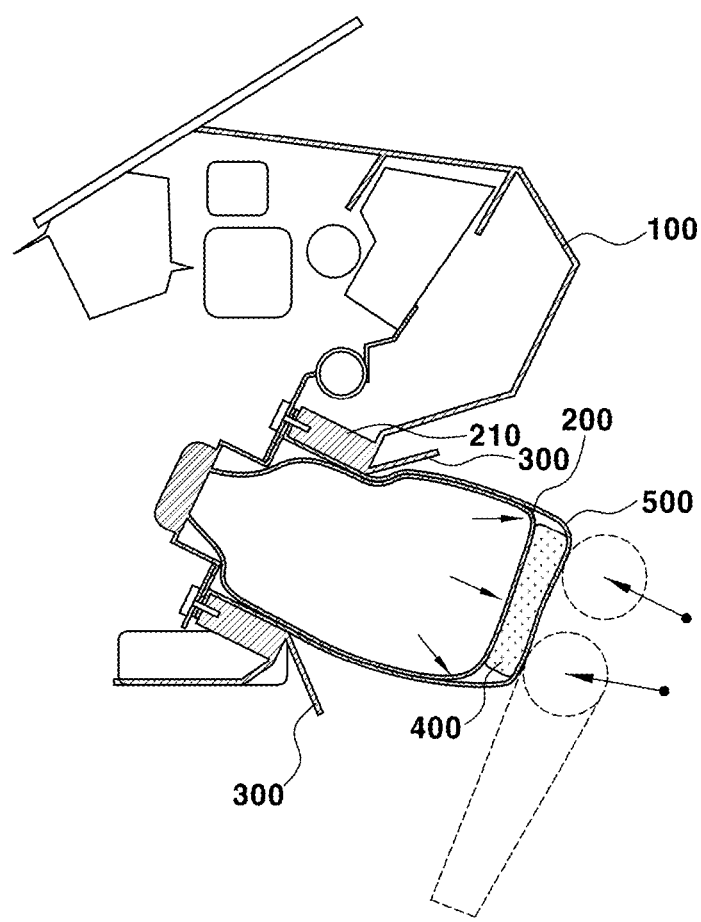
FIG. 1B is a diagram illustrating a side view of the KAB including a single foam in a state of being deployed according to one embodiment of the present disclosure.
Figure 2B:
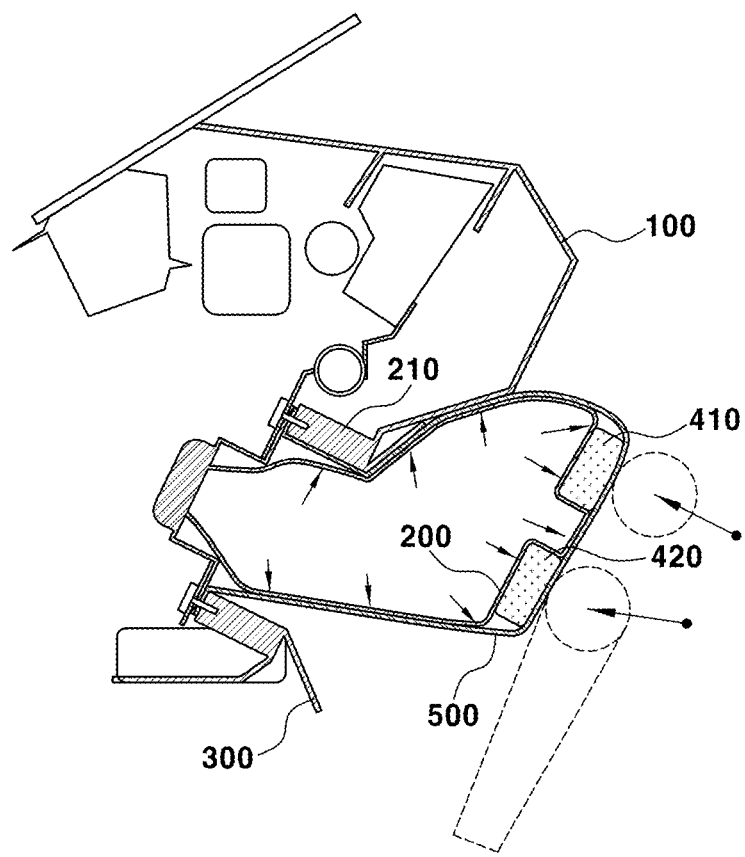
FIG. 2B is a diagram illustrating a side view of the KAB including two foams in a state of being deployed according to one embodiment of the present disclosure.

FIGS. 1A and 1B illustrate a mounted state and a deployed state of a KAB 200 including a single absorber 400, and FIGS. 2A and 2B illustrate a mounted state and a deployed state of a KAB 200 including an absorber 400 formed of two foams.

The KAB 200 of embodiments of the present disclosure is formed to be engaged with an inflator located in the cockpit 100 and is formed to be located at a relatively lower portion of the cockpit 100. The KAB 200 may be mounted in a folded state inside an airbag housing 210 located in the cockpit 100.

An outer surface of the cockpit 100 includes an airbag door 300 capable of providing an opening of the KAB 200 when the KAB 200 is deployed. The airbag door 300 may be deployed in both directions or may include a door shape capable of being deployed in one direction. More preferably, an airbag door 300 integrally formed with the absorber 400 may be included. The airbag door 300 may be located on one surface of the cockpit 100 facing the occupant and may be formed to correspond to a position facing a knee and a shin of the occupant when the KAB 200 is deployed.

The KAB 200 of embodiments of the present disclosure may be deployed in response to a front collision and an impact of a vehicle, and when a front collision or an impact of the vehicle is applied, a controller of the vehicle may be formed to drive the inflator, thereby expanding the KAB 200.

At least one end of both ends of the airbag door 300 is engaged with an inner side of the airbag housing 210 to prevent the airbag door 300 from being sheared when the KAB 200 is deployed. In addition, the airbag door 300 may be made of the same physical property as a guide part 500 to be extended when the KAB 200 is deployed.

The absorber 400 formed of one foam or two or more foams may be located at one end on which the KAB 200 is deployed. FIGS. 1A and 1B illustrate an absorber 400 formed of one foam, and FIGS. 2A and 2B illustrate an absorber 400 including a first foam 410 and a second foam 420.

In a state in which the KAB 200 is mounted, the guide part 500 located between the airbag door 300 and the KAB 200 may be included. In addition, in a state in which the KAB 200 is deployed, the guide part 500 may be formed to surround a front surface of the absorber 400 and at least two of side surfaces of the absorber 400 and the KAB 200. One end of the guide part 500 may be formed to be integrally fixed to the airbag housing 210 with one end of the KAB 200, and the other end thereof may correspond to the other end of the KAB 200 and may be located and mounted inside the airbag housing 210 in a folded state. More preferably, the guide part 500 may be formed to surround an outer side of the KAB 200 and may be located to surround at least two side surfaces of the KAB 200.

In addition, as shown in FIGS. 2A and 2B, an outer surface of the absorber 400 formed of the first foam 410 and the second foam 420 is formed to be surrounded by the guide part 500. More preferably, as shown in FIG. 2A, the first foam 410 and the second foam 420 are formed at adjacent locations in a state in which the KAB 200 is mounted, and as shown in FIG. 2B, when the KAB 200 is deployed, the first foam 410 and the second foam 420 are formed to be spaced apart from each other by a predetermined distance. Moreover, when the KAB 200 is deployed, it may be formed such that a portion of a front end of the KAB 200 is located at and inserted into a space between the first foam 410 and the second foam 420.

As described above, in a state in which the KAB 200 is mounted, when a portion of the guide part 500 is maintained in a folded state between the first foam 410 and the second foam 420 and the KAB 200 is deployed, the guide part 500 is formed such that the portion of the guide part 500 located in the folded state between the first foam 410 and the second foam 420 is unfolded, and thus the first foam 410 and the second foam 420 are spaced apart from each other.

The guide part 500 may be made of a fabric tether, and more preferably, a nylon material. In addition, the guide part 500 is formed to cover the front surface of the absorber 400 facing the knee of the occupant, and one end of the guide part 500 is formed to be simultaneously fixed to one end of the KAB 200 inside the airbag housing 210.

In addition, the guide part 500 is formed to extend between a front end of the absorber 400 and the airbag housing 210, and thus the guide part 500 is formed to surround at least two side surfaces corresponding to each other among side surfaces of the KAB 200 and the absorber 400.

Figure 3A:
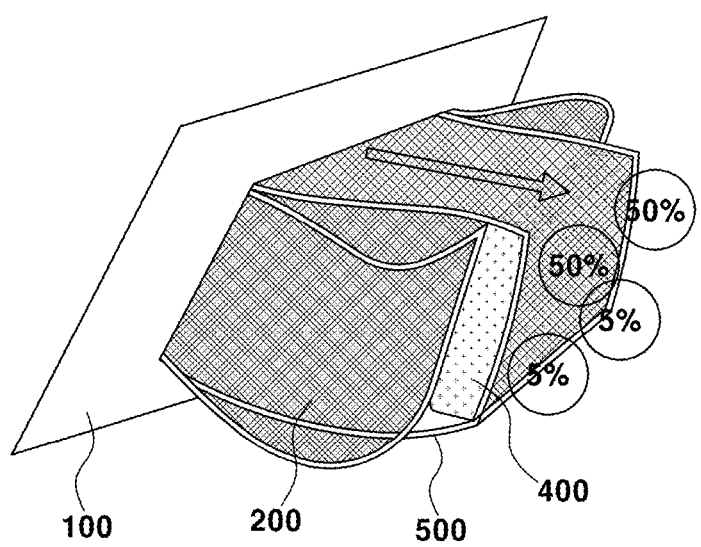
FIG. 3A is a diagram illustrating a guide part configured to surround a front surface of an absorber and upper and lower surfaces of a KAB in a state in which the KAB is deployed according to one embodiment of the present disclosure.
Figure 3B:
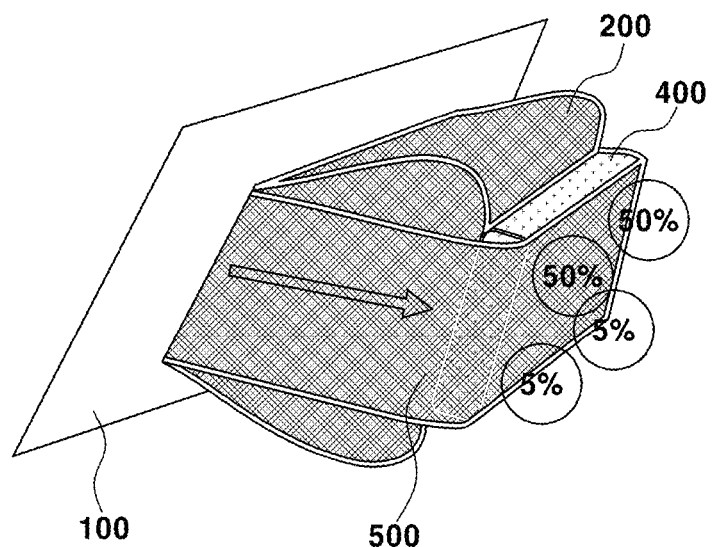
FIG. 3B is a diagram illustrating a guide part configured to surround the front surface of the absorber and left and right surfaces of the KAB in a state in which the KAB is deployed according to one embodiment of the present disclosure.

FIGS. 3A and 3B illustrate a configuration of the guide part 500 engaged with the deployed KAB 200.

As shown in FIG. 3A, the guide part 500 is configured to surround side surfaces located above and below the deployed KAB 200 and the absorber 400 and to surround the front surface of the absorber 400.

When the guide part 500 is formed to surround an upper surface and a lower surface of the deployed KAB 200, since a vertical protruding amount of the KAB 200 and the absorber 400 which absorb an impact may be constant, it is possible to stably absorb impact energy applied in various knee shapes distributed in a vertical direction. In addition, according to the development of the KAB 200, a structural feature capable of preventing the KAB 200 from sagging in a direction of gravity is included.

In comparison, FIG. 3B illustrates a guide part 500 configured to surround left and right side surfaces of the deployed KAB 200 and the absorber 400 and surround the front surface of the absorber 400.

Since the guide part 500 is configured to surround the left and right sides of the deployed KAB 200, left and right protruding amounts of the KAB 200 and the absorber 400 may be set to be consistent. Therefore, a structure capable of stably absorbing a knee impact distributed in a left-right direction is provided. In addition, the above structure may provide an effect capable of minimizing a deviation in contact time between left and right knees and the absorber 400.

That is, as shown in FIGS. 3A and 3B, since the guide part 500 is formed to surround at least two side surfaces of the deployed KAB 200, in response to an inclination of the cockpit 100 and a shape of the cockpit 100, the protruding amounts of the KAB 200 and the absorber 400 may be controlled to appropriately distribute the impact applied to the knee of the occupant.

Figure 4A:
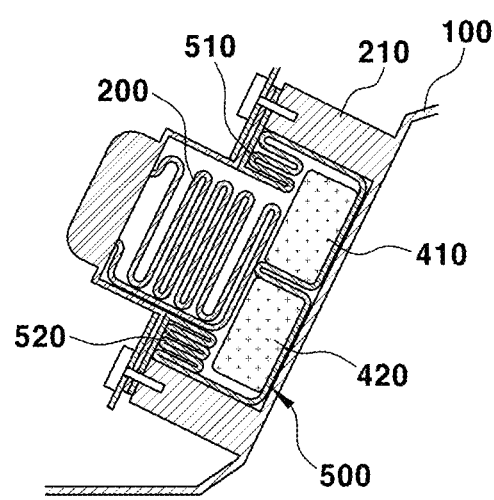
FIG. 4A is a diagram illustrating a folded state of the guide part when a cockpit is formed at an angle that is smaller than a first angle according to one embodiment of the present disclosure.
Figure 4B:
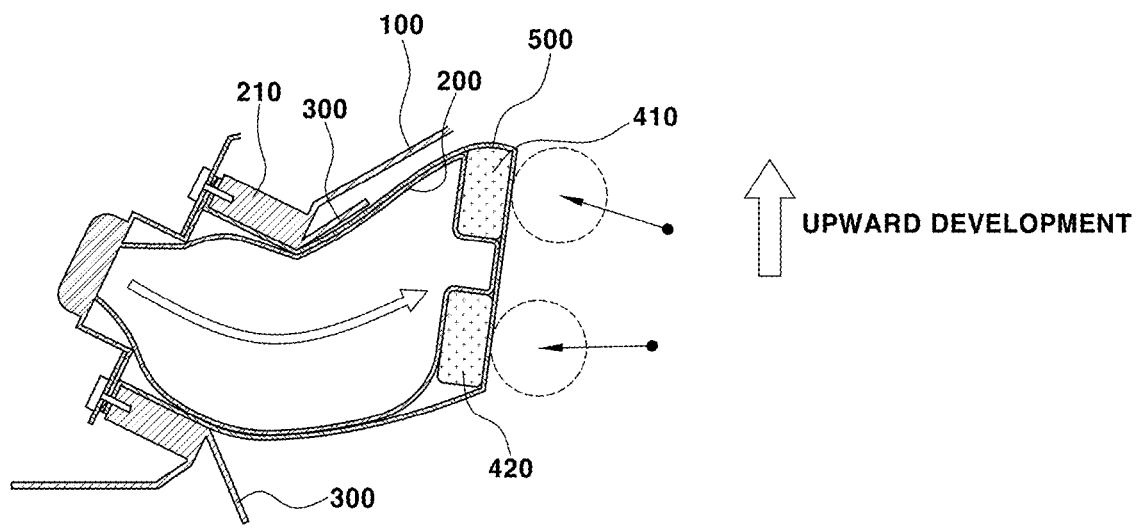
FIG. 4B is a diagram illustrating a deployment direction upon the deployment of the KAB when the cockpit is formed at an angle that is smaller than the first angle according to one embodiment of the present disclosure.

FIGS. 4A and 4B illustrate a difference in folded amount between a first folding part 510 and a second folding part 520 of the guide part 500 according to an angle formed between the outermost surface of the cockpit 100 and a horizontal plane.

As shown in FIG. 4A, the KAB 200 may be located in a folded state in a direction substantially parallel to the outer surface of the cockpit 100, and the guide part 500 may be located on the side surface of the KAB 200 so as to surround one deployed end of the KAB 200 in the folded state.

The guide part 500 may be located in a folded state on at least two different side surfaces of the KAB 200. As described above, the guide pall 500 may be located to surround upper and lower surfaces or left and right side surfaces on the basis of the mounted KAB 200 and the front end thereof.

In addition, based on the horizontal plane of the vehicle, the cockpit 100 may be formed to have an angle that is smaller than a first reference value. As described above, in the case of the cockpit 100 formed at the angle that is smaller than the first reference value, when compared with the first folding part 510, the second folding pall 520 may include a relatively large folded amount.

In addition, in a state in which the KAB 200 is mounted in the cockpit 100, the first folding part 510 of the guide part 500 is located at a relatively upper end based on the cockpit 100, and the second folding part 520 of the guide part 500 is located at a relatively lower end based on the cockpit 100.

That is, in the case of the cockpit 100 formed at the angle that is smaller than the first reference value, since the KAB 200 is deployed at a height that is lower than a height of the knee when a number of folds of the second folding pall 520 is equal to a number of folds of the guide part 500 forming the first folding part 510, the number of folds of the second folding part 520 is increased so that the KAB 200 may be controlled to be relatively deployed upward in a height direction of the vehicle.

As shown in FIG. 4B, a length of the guide part 500 in which the second folding part 520 is deployed is relatively longer than a length of the guide part 500 in which the first folding part 510 is deployed, and thus when the KAB 200 is deployed, the front surface of the absorber 400 may be deployed to a position that is relatively higher than one surface side facing the cockpit 100.

Figure 5A:
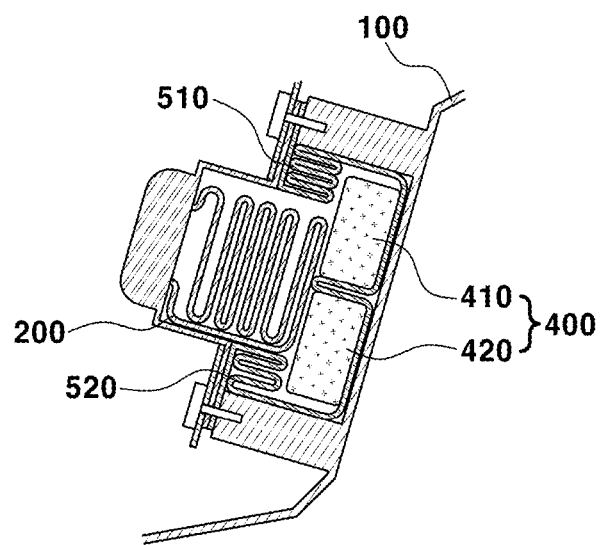
FIG. 5A is a diagram illustrating a folded state of the guide part when the cockpit is formed at an angle that is greater than the first angle according to one embodiment of the present disclosure.
Figure 5B:
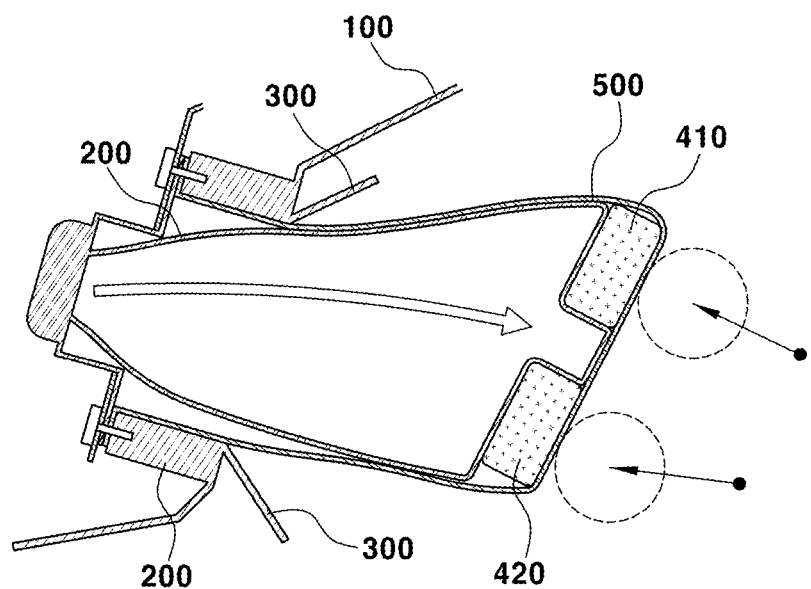
FIG. 5B is a diagram illustrating a deployment direction upon the deployment of the KAB when the cockpit is formed at an angle that is greater than the first angle according to one embodiment of the present disclosure.

When compared with FIGS. 4A and 4B, in FIGS. 5A and 5B, when the outer surface of the cockpit 100 facing an interior of the vehicle is formed at an angle that is greater than the first reference value based on the horizontal plane of the vehicle, settings of folded amounts of the first folding part 510 and the second folding part 520 are illustrated.

When the cockpit 100 is located at an angle that is greater than the first reference value based on the horizontal plane, the airbag door 300 located in the cockpit 100 faces a position that is relatively higher than a position of the knee of the occupant. Therefore, the number of folds of the first folding part 510 of the guide part 500 is configured to be greater than the number of folds of the second folding part 520.

As shown in FIG. 5B, when the guide part 500 is deployed together with the KAB 200, a deployed length of the guide part 500 in which the first folding part 510 is located is configured to be relatively greater than a deployed length of the guide part 500 in which the second folding part 520 is located. Accordingly, the KAB 200 is deployed to face a position that is relatively lower than an area facing the cockpit 100.

As described above, according to embodiments of the present disclosure, since the number of folds of the first folding part 510 and the second folding part 520 are set and, when the KAB 200 is deployed, a position of the height direction in which the guide part 500 faces is set, the KAB 200 is configured to be deployed to a position substantially corresponding to the knee of the occupant.

Figure 6A:
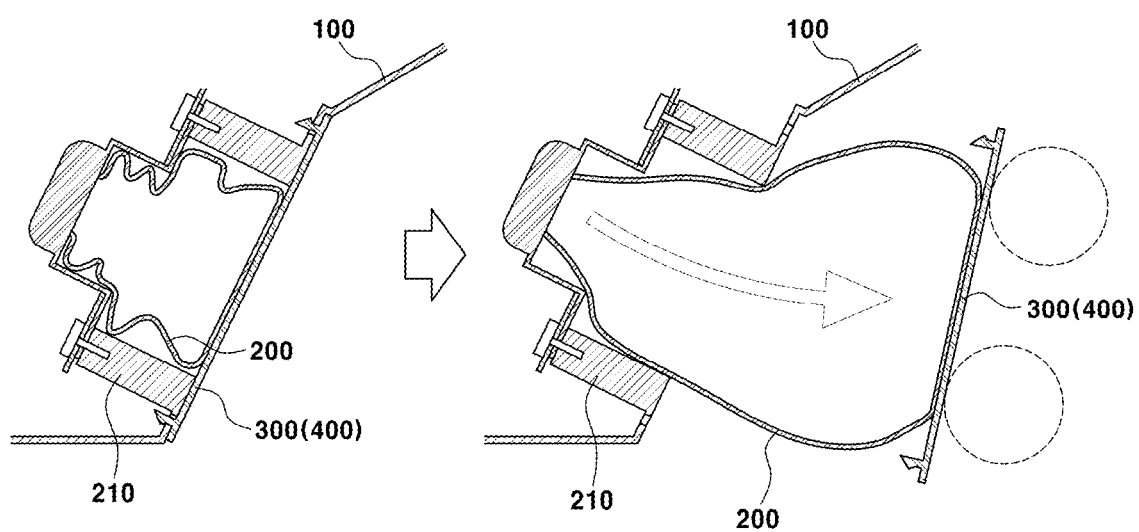
FIG. 6A is a diagram illustrating a configuration in which an airbag door is fused to one side surface of the KAB being deployed and is integrally deployed according to one embodiment of the present disclosure.

FIG. 6A illustrates an airbag door integrally deployed with an airbag according to one embodiment of the present disclosure.

The outermost surface of the KAB 200 being deployed is configured to be located in contact with the airbag door 300, and in one embodiment of the present disclosure, the outermost side of the KAB 200 and the inner side of the airbag door 300 are fused and located.

More preferably, the airbag door 300 may be made of a thermoplastic olefin (TPO) material, and then when the KAB 200 is deployed, the airbag door 300 may be configured to perform the same function as the absorber 400.

That is, the airbag door 300 may be made of a material which absorbs an impact when the KAB 200 is deployed, thereby being fused to and located at the outermost side surface of the KAB 200.

Figure 6B:
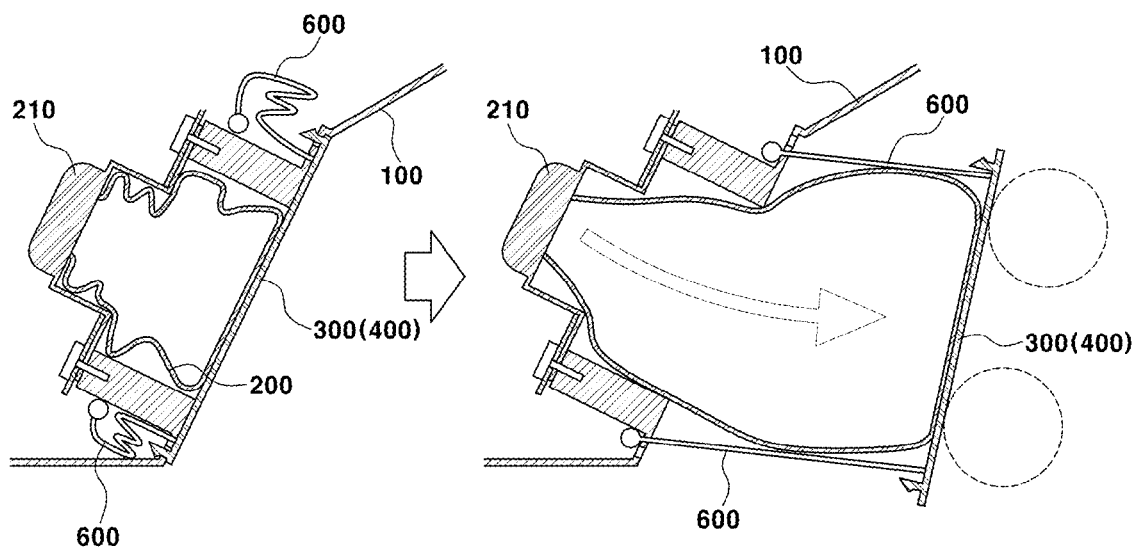
FIG. 6B is a diagram illustrating a deploy part located on both sides of the airbag door so as to allow the airbag door to be integrally deployed together with the KAB according to one embodiment of the present disclosure.

In addition, FIG. 6B illustrates a configuration of a deploy part 600 which is engaged with the airbag door 300 when the KAB 200 is deployed.

In one embodiment of the present disclosure, the deploy part 600 engaged with an inner surface of the airbag door 300 may be included, one end of the deploy part 600 may be located on both ends in the airbag door 300, and thus the other end thereof may be fixed to and located on an inner side of the cockpit 100.

Therefore, when the KAB 200 is deployed, the airbag door 300 is integrally deployed, and the deploy part 600 prevents the airbag door 300 from being separated so that the KAB 200 and the airbag door 300 may be integrally deployed.

In this case, the airbag door 300 may be made of a TPO material, and the deploy part 600 may be made of a nylon material so as to be contracted and located on an outer surface of the airbag housing 210.

In addition, deployment heights and deployment lengths of the KAB 200 and the airbag door 300 may be set according to a length of the deploy part 600.

Figure 6C:
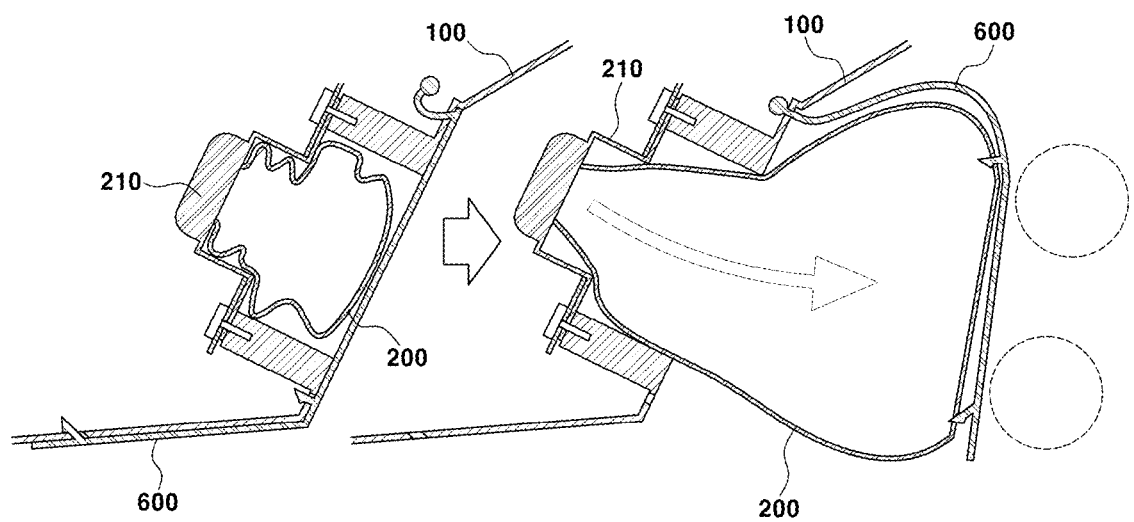
FIG. 6C is a diagram illustrating the deploy part extending from an inner side of the cockpit so as to allow the airbag door to be integrally deployed together with the KAB according to one embodiment of the present disclosure.

FIG. 6C illustrates a configuration in which one end of the deploy part 600 made of a nylon material is fixed to one end of the airbag housing 210, and the other end thereof is located to surround the other end of the airbag housing 210.

Therefore, when the KAB 200 is deployed, the other end of the deploy part 600 configured to surround the KAB 200 and the airbag housing 210 is separated from the airbag housing 210, and one end thereof is fixed to the airbag housing 210 so that a deployment direction and a deployment height of the KAB 200 may be controlled.

The deploy part 600 is formed to surround the KAB 200, and when the KAB 200 is deployed, the deploy part 600 is formed to be deployed integrally with the KAB 200.

An inner surface of the other end of the deploy part 600 formed to surround the airbag housing 210 may include one or more hooks to be fixed to the airbag housing 210.

However, engagement of the deploy part 600 and the airbag housing 210 which are engaged through the hook is released in response to a deployment force of the KAB 200, and the KAB 200 is formed to be deployed integrally with the deploy part 600.

Figure 7:
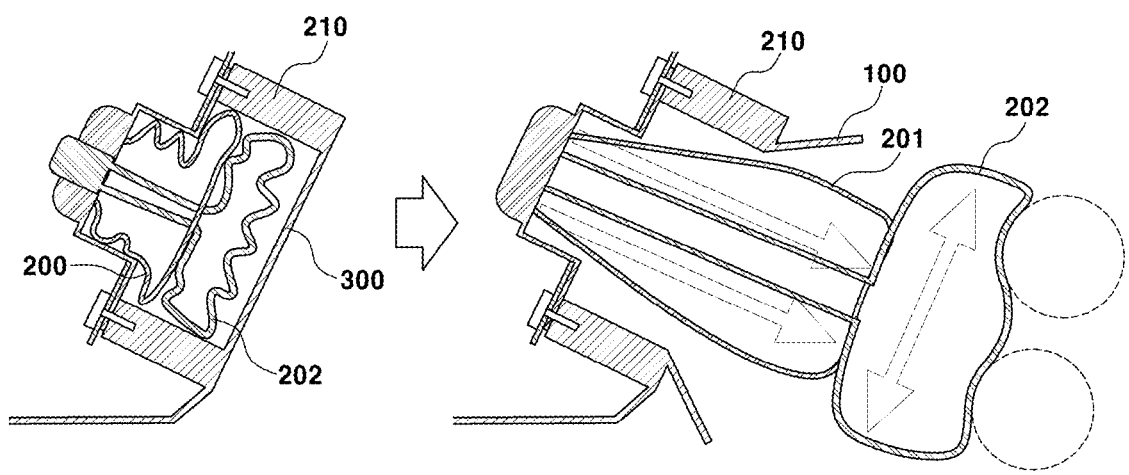
FIG. 7 is a diagram illustrating an apparatus for a KAB including two airbags according to one embodiment of the present disclosure.

FIG. 7 illustrates a configuration of the KAB 200 including a first airbag 201 and a second airbag 202.

The first airbag 201 located adjacent to an inner circumferential surface of the airbag housing 210 and the second airbag 202 located on an inner side of the first airbag 201 may be further included in the airbag housing 210.

When the KAB 200 is deployed, the first airbag 201 is formed to be deployed from the airbag housing 210 to the interior of the vehicle and the second airbag 202 is formed to be deployed in a lengthwise direction of the airbag housing 210. At the same time, a deployment force is applied to the second airbag 202 in a width direction to which the impact is applied.

More preferably, the first airbag 201 may be formed to be deployed in a direction of the interior of the vehicle, and the second airbag 202 may be formed to be deployed in a direction perpendicular to a direction in which the first airbag is deployed.

That is, the first airbag 201 and the second airbag 202 are formed to be simultaneously deployed based on the airbag housing 210, the first airbag 201 is formed to be deployed in a lengthwise direction of the housing 210, and the second airbag 202 is formed to be deployed in a width direction of the airbag housing 210. The direction in which the second airbag 202 is deployed may be set in a direction perpendicular to the lengthwise direction of the airbag housing 210, and more preferably, the first airbag 201 and the second airbag 202 may each be deployed to have an angle which is set based on the side surface of the cockpit 100. In addition, the second airbag 202 may be formed to perform substantially the same function as the absorber 400.

Embodiments of the present disclosure can obtain the following effects according to a combination of the above-described embodiments and a configuration, which has been described above, and a use relationship.

Embodiments of the present disclosure have an effect of providing an apparatus for a KAB (knee airbag) which can be easily tuned through the apparatus for a KAB configured to have various deployment angles in a height direction of a cockpit.

In addition, embodiments of the present disclosure have an effect of providing an apparatus for a KAB capable of alleviating an impact applied to the knee through the apparatus for a KAB including an absorber located at a front end of an airbag.

In addition, embodiments of the present disclosure can provide an apparatus for a KAB capable of selectively changing a deployment direction in response to an angle formed by the cockpit and has an effect of providing the apparatus for a KAB which can be applied to various vehicles.

The foregoing detailed description illustrates embodiments of the present disclosure. Further, the foregoing is intended to illustrate and describe the exemplary embodiments of the present disclosure, and the present disclosure may be used in various other combinations, modifications, and environments. That is, it is possible to practice alternations or modifications without departing from the scope of the present disclosure disclosed in this specification, equivalents, and/or within the technical or knowledge scope in the art to which the present disclosure pertains. The described embodiments are intended to illustrate the best mode for carrying out the technical spirit of the present disclosure and various modifications can made in the specific applications and uses of the present disclosure. Therefore, the detailed description is not intended to limit the present disclosure as in the disclosed embodiments. Further, it should be construed that the appended claims are intended to other embodiments.

What is claimed is:

1. An apparatus for a knee airbag, the apparatus comprising:
   an airbag locatable inside a cockpit in a front side of an interior of a vehicle, wherein the airbag is mountable in a folded state in the same direction as an outer surface of the cockpit;
   an airbag door locatable in the cockpit at a position facing an occupant knee area, the airbag door being configured to open when the airbag is deployed;
   an absorber located at a front end of the airbag; and
   a guide part surrounding at least two surfaces of the absorber and the airbag, wherein the guide part is located on sides of the airbag in the folded state in a direction perpendicular to the outer surface of the cockpit and a direction of the folded state of the airbag,
   wherein, when an angle in a horizontal direction of the cockpit is smaller than a first reference value, a number of folds of a second folding part of the guide part in the folded state is greater than a number of folds of a first folding part of the guide part in the folded state, and
   wherein the absorber comprises two foams located adjacent to each other when the airbag is in a non-deployed state.

2. The apparatus of claim 1, wherein the guide part surrounds a front surface of the absorber and upper and lower surfaces of the absorber and the airbag.

3. The apparatus of claim 1, wherein the two foams are configured to be spaced apart from each other along a front surface of the guide part when the airbag is in a deployed state.

4. The apparatus of claim 3, wherein the airbag is configured to extend between the two foams spaced apart from each other.

5. A vehicle comprising:
   an occupant seat disposed in an interior of the vehicle;
   a cockpit disposed in a front side of the interior of the vehicle;
   an airbag disposed inside the cockpit, the airbag being mounted in a folded state in the same direction as an outer surface of the cockpit;
   an airbag door disposed in the cockpit at a position facing an occupant knee area provided between the cockpit and the occupant seat, the airbag door being configured to open when the airbag is deployed;
   an absorber disposed at a front end of the airbag when the airbag is in a non-deployed state and when the airbag is in a deployed state; and
   a guide part surrounding at least two surfaces of the absorber and the airbag when the airbag is in the non-deployed state and when the airbag is in the deployed state, wherein the guide part is located on sides of the airbag in the folded state in a direction perpendicular to the outer surface of the cockpit and a direction of the folded state of the airbag,
   wherein, when an angle in a horizontal direction of the cockpit is smaller than a first reference value, a number of folds of a second folding part of the guide part in the folded state is greater than a number of folds of a first folding part of the guide part in the folded state, and
   wherein the absorber comprises two foams located adjacent to each other and having a first spacing between the two foams when the airbag is in the non-deployed state.

6. The vehicle of claim 5, wherein the two foams are spaced apart from each other by a second spacing larger than the first spacing when the airbag is in the deployed state.

7. The vehicle of claim 6, wherein the airbag is configured to fill the second spacing between the two foams when the airbag is in the deployed state.

* * * * *